United States Patent
Polehn et al.

(10) Patent No.: US 9,265,067 B2
(45) Date of Patent: Feb. 16, 2016

(54) CONTROLLING CONNECTION TO AN ACCESS NETWORK BY MACHINE-TO-MACHINE DEVICES

(71) Applicants: Verizon Patent and Licensing Inc., Basking Ridge, NJ (US); Cellco Partnership, Basking Ridge, NJ (US)

(72) Inventors: Donna L. Polehn, Kirkland, WA (US); Arda Aksu, Martinez, CA (US); David Chiang, Fremont, CA (US); Steven R. Rados, Danville, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 10 days.

(21) Appl. No.: 14/206,568

(22) Filed: Mar. 12, 2014

(65) Prior Publication Data

US 2015/0264709 A1 Sep. 17, 2015

(51) Int. Cl.
| | |
|---|---|
| *H04B 1/60* | (2006.01) |
| *H04M 11/00* | (2006.01) |
| *H04W 72/00* | (2009.01) |
| *H04W 74/00* | (2009.01) |
| *H04L 12/26* | (2006.01) |
| *H04W 4/00* | (2009.01) |

(52) U.S. Cl.
CPC .......... *H04W 74/002* (2013.01); *H04L 43/0882* (2013.01); *H04W 4/005* (2013.01)

(58) Field of Classification Search
CPC ..... H04W 74/04; H04W 28/00; H04W 28/02; H04W 4/005; H04W 74/0875
USPC .............................................. 455/453, 9, 405
See application file for complete search history.

(56) References Cited

U.S. PATENT DOCUMENTS

| | | | |
|---|---|---|---|
| 2010/0188990 A1* | 7/2010 | Raleigh ........................ | 370/252 |
| 2011/0111765 A1* | 5/2011 | Yang et al. ................ | 455/452.1 |
| 2012/0054661 A1* | 3/2012 | Rados ................ | H04L 41/5032 |
| | | | 715/772 |

* cited by examiner

*Primary Examiner* — Thomas Lett

(57) ABSTRACT

A device receives a pilot channel from an access network, without connecting to the access network. The pilot channel includes information identifying an actual usage associated with the access network. The device determines whether the actual usage of the access network is greater than a particular usage associated with the access network, and selectively connects to the access network based on whether the actual usage of the access network is greater than the particular usage. The device connects to the access network, to provide data to a core network, when the actual usage of the access network is not greater than the particular usage. The device does not connect to the access network when the actual usage of the access network is greater than the particular usage.

20 Claims, 16 Drawing Sheets

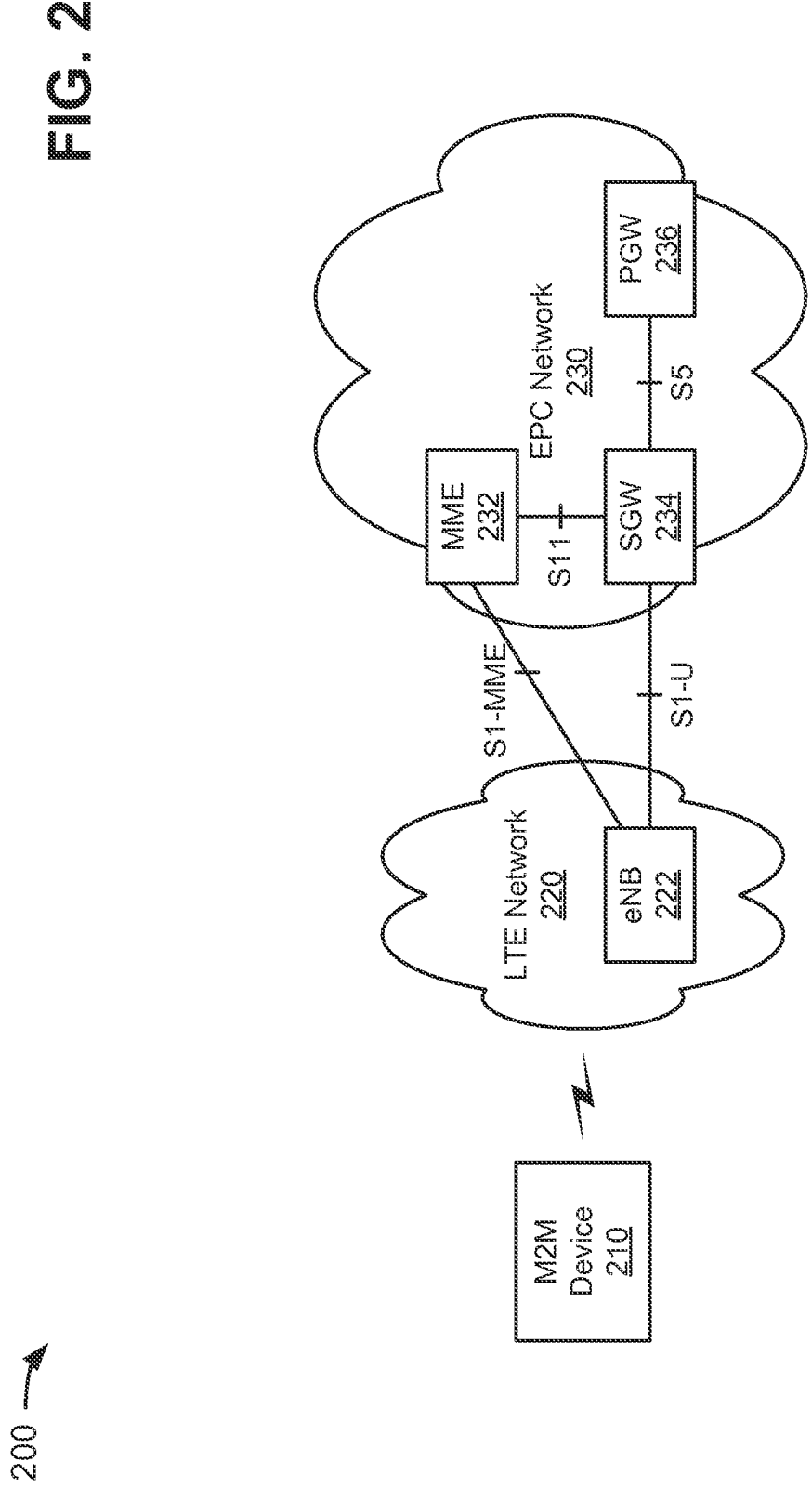

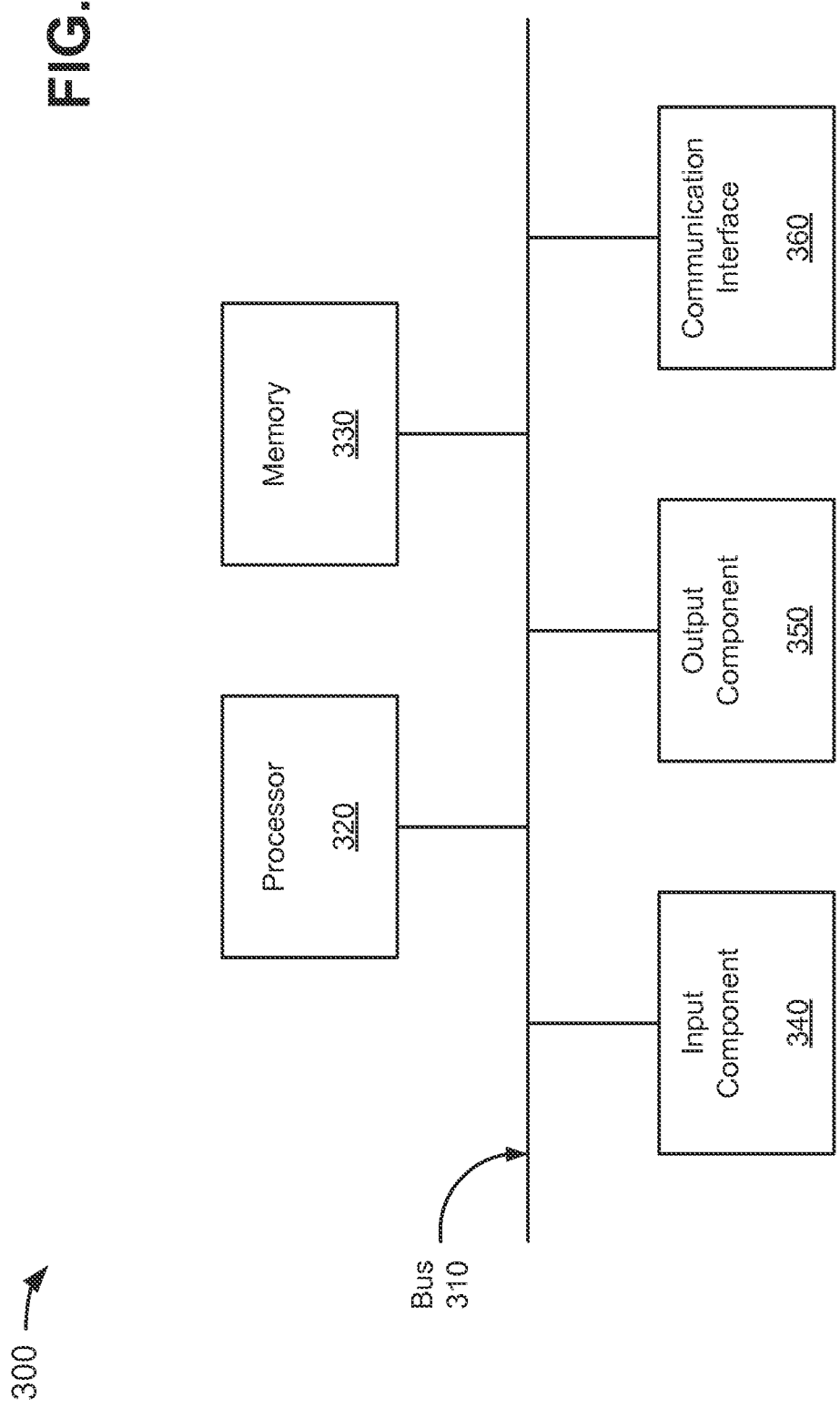

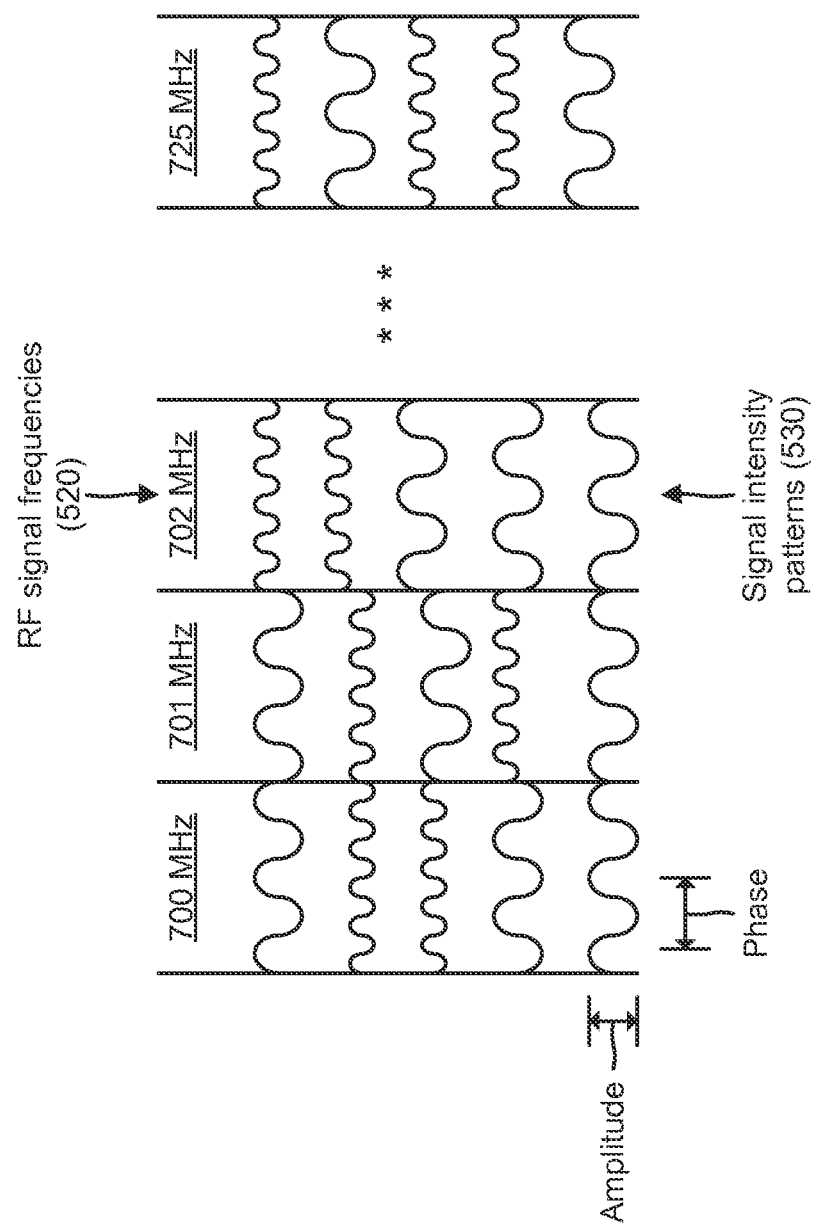

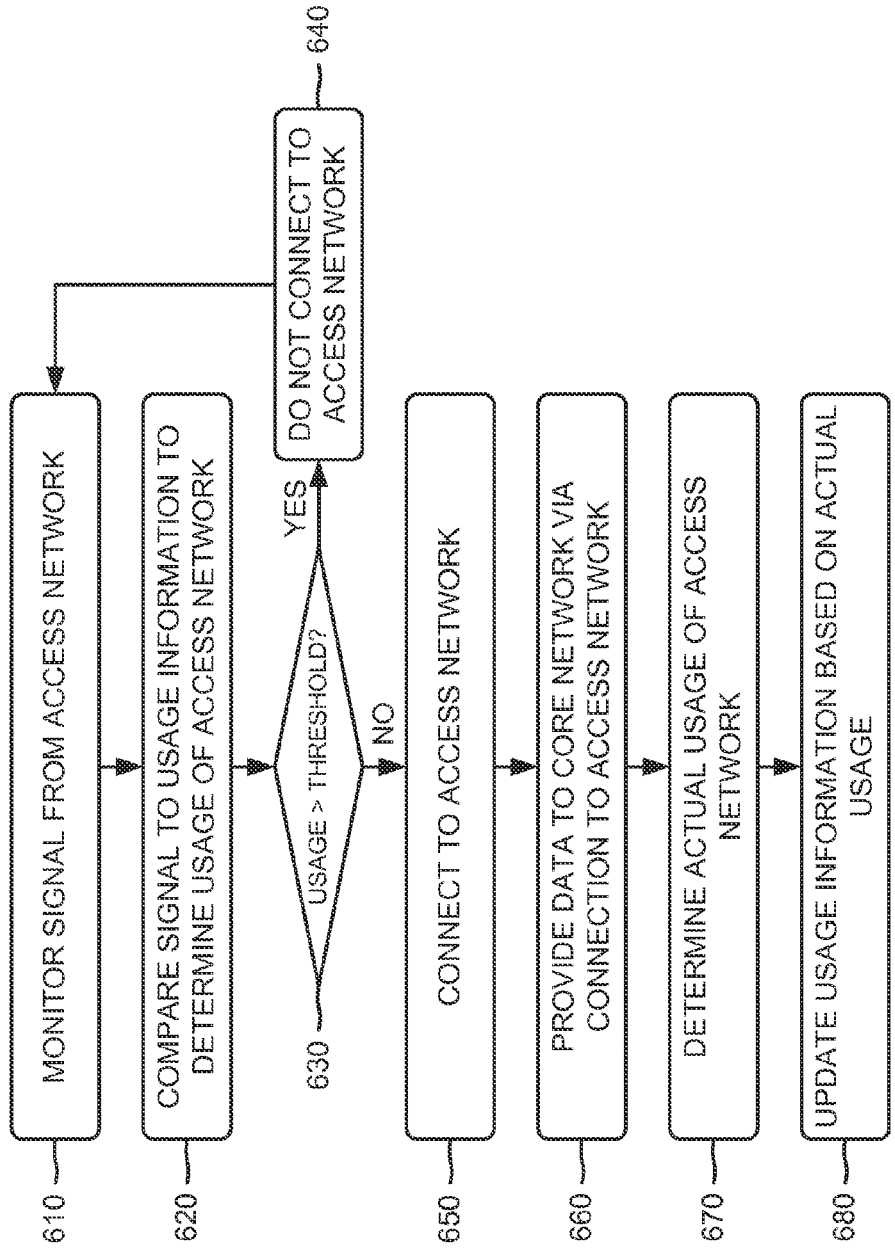

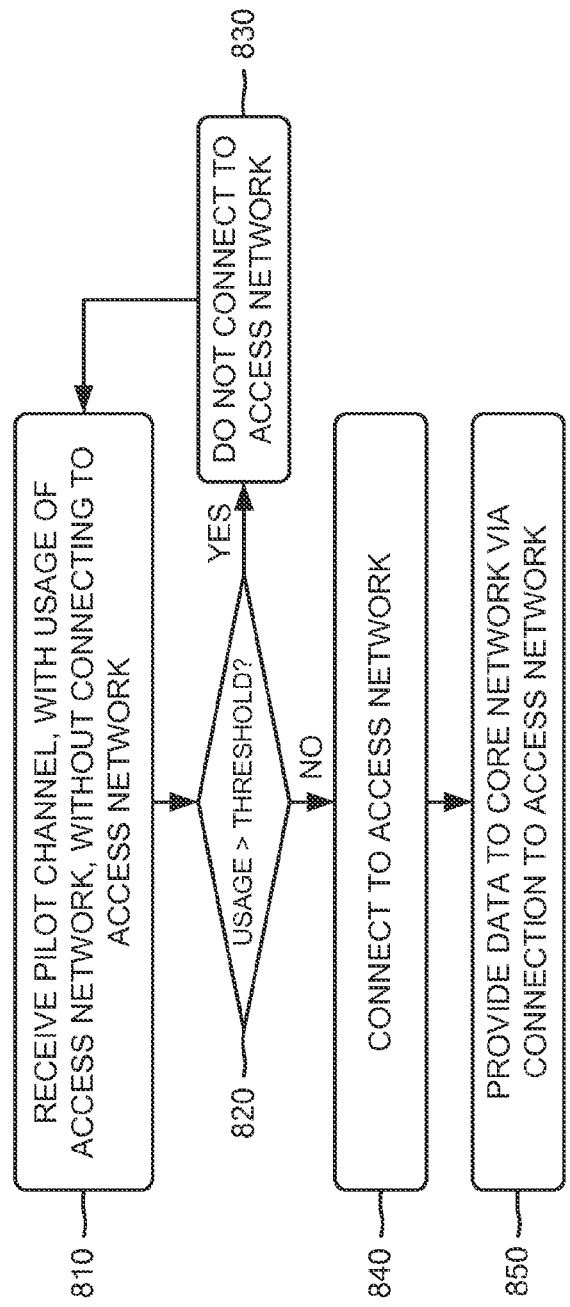

CONTROLLING CONNECTION TO AN ACCESS NETWORK BY MACHINE-TO-MACHINE DEVICES

BACKGROUND

In the Third Generation Partnership Project (3GPP), the fourth generation (4G) cellular network includes a radio access network (e.g., referred to as a long term evolution (LTE) network) and a wireless core network (e.g., referred to as an evolved packet core (EPC) network). The LTE network is often called an evolved universal terrestrial radio access network (E-UTRAN). The EPC network is an Internet protocol (IP) packet-switched core network that supports high-speed wireless and wireline broadband access technologies. The EPC network allows user equipment (UEs) to access various services by connecting to the LTE network, an evolved high rate packet data (eHRPD) radio access network (RAN), and/or a wireless local area network (WLAN) RAN. The EPC network is a complex system that includes a number of network nodes that communicate with each other when UEs are accessing the EPC network. Some of the UEs may include machine-to-machine (M2M) devices, such as sensors, meters, machinery, vending machines, digital billboards, telemetric devices, appliances, etc.

BRIEF DESCRIPTION OF THE DRAWINGS

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for determining usage information for an access network based on signals generated by the access network;

FIGS. 5A-5D are diagrams of an example relating to the example process shown in FIG. 4;

FIG. 6 is a flow chart of an example process for determining when a M2M device can connect to an access network based on usage of the access network;

FIG. 8 is a flow chart of another example process for determining when a M2M device can connect to an access network based on usage of the access network.

DETAILED DESCRIPTION OF PREFERRED EMBODIMENTS

The following detailed description refers to the accompanying drawings. The same reference numbers in different drawings may identify the same or similar elements.

M2M devices periodically connect to an access network (e.g., a LTE network) in order to communicate with a core network (e.g., an EPC network). The M2M devices communicate with the core network so that the M2M devices may upload data to server devices provided in or connected to the core network. For example, a power meter may upload power data to a server device associated with a utility company. However, if a large number of M2M devices connect to the same access network around the same time, the access network may become overloaded and degrade a quality of service (QoS) provided by the access network. A M2M device attempting to connect to an overloaded access network may further degrade the QoS provided by the access network. Even an attempt to connect to the access network by a M2M device creates a load on the access network since several control and overhead messages are exchanged during the attempt to connect.

Figure 1A:
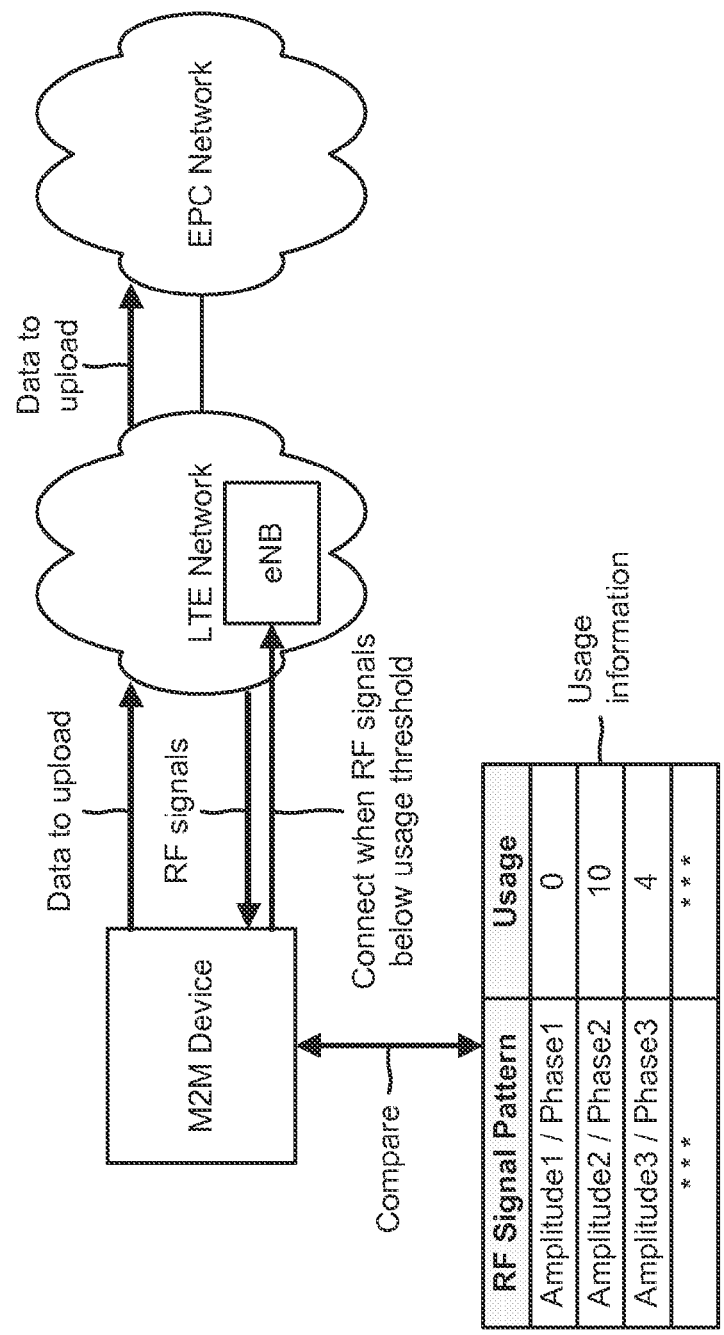
FIGS. 1A and 1B are diagrams of an overview of an example implementation described herein.
Figure 1B:
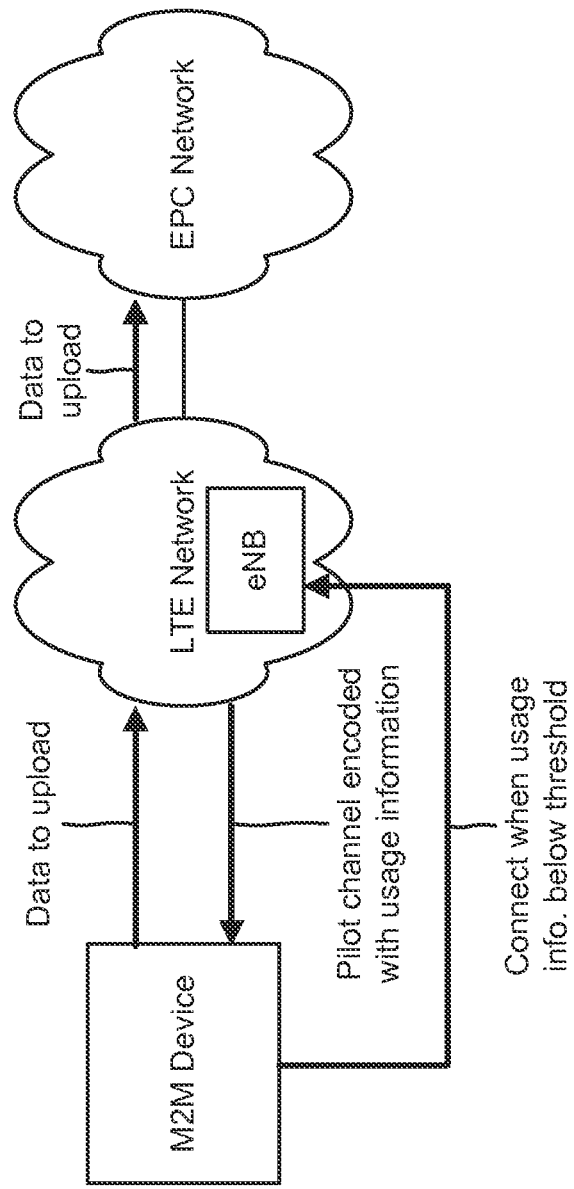

FIGS. 1A and 1B are diagrams of an overview of an example implementation 100 described herein. In example implementation 100, assume that a M2M device is associated with an access network (e.g., a LTE network with an eNodeB (eNB)) and a core network (e.g., an EPC network). As shown in FIG. 1A, the M2M device may have access to usage information that identifies a usage or a load of the LTE network (e.g., where a lower value may indicate less usage than a higher value) based on signal patterns generated by the LTE network. For example, a usage of "0" may indicate a minimum usage of resources (e.g., by the eNB) of the LTE network; a usage of "5" may indicate a partial usage of the resources (e.g., 40%, 50%, etc. utilization of the resources); etc.

In some implementations, the M2M device may monitor radio frequency (RF) signals generated by the LTE network, without connecting to the LTE network. The M2M device may compare patterns of the RF signals to the usage information in order to determine a current usage associated with the LTE network, as further shown in FIG. 1A. Assume that the M2M device determines that the current usage is "4" based on the RF signals. The M2M device may compare the current usage to a usage threshold in order to determine whether to connect to the LTE network. If the current usage is above the usage threshold, the M2M device may not connect to the LTE network and may not transmit signals to the LTE network. If the current usage is below the usage threshold, the M2M device may connect to the LTE network, and may provide data to upload to the LTE network. The LTE network may forward the data to the EPC network, as further shown in FIG. 1A.

In some implementations, as shown in FIG. 1B, the eNB may generate a pilot channel that includes information indicating a current usage of the LTE network (e.g., where a lower value may indicate less usage than a higher value). For example, a usage of "10" may indicate a maximum usage of resources (e.g., the eNB) of the LTE network; a usage of "2" may indicate a partial usage of the resources (e.g., 20%, 30%, etc. utilization of the resources); etc. The M2M device may receive the pilot channel and the usage information from the eNB, without connecting to the LTE network. The M2M device may compare the usage information to a usage threshold in order to determine whether to connect to the LTE network. If the usage information is above the usage threshold, the M2M device may not connect to the LTE network and may not transmit signals to the LTE network. If the usage information is below the usage threshold, the M2M device may connect to the LTE network, and may provide data to upload to the LTE network. The LTE network may forward the data to the EPC network, as further shown in FIG. 1B.

Systems and/or methods described herein may enable one or more M2M devices to connect to an access network when usage of the access network is minimal (e.g., below a usage threshold). This may prevent the access network from becoming overloaded, and may ensure a quality of service (QoS) provided by the access network. The systems and/or methods may prevent all of the M2M devices, associated with the access network, from connecting to and transmitting information to the access network at the same time. This may prevent co-channel interference from occurring between the M2M devices. Although implementations are described herein in connection with LTE networks, the systems and/or methods may be utilized with other types of wireless networks, such as, for example, an evolved high rate packet data (eHRPD) radio access network (RAN), a wireless local area network (WLAN) RAN, a global system for mobile communications (GSM) network, a code division multiple access (CDMA) network, etc. Although implementations are described herein in connection with M2M devices, the systems and/or methods may be utilized with other types of user equipment capable of connecting to an access network (e.g., smart phones, radiotelephones, tablet computers, etc.).

FIG. 2 is a diagram of an example environment 200 in which systems and/or methods described herein may be implemented. As illustrated, environment 200 may include a M2M device 210, a LTE network 220, and an EPC network 230. LTE network 220 may include an eNodeB (eNB) 222. EPC network 230 may include a mobility management entity (MME) 232, a serving gateway (SGW) 234, and a packet data network (PDN) gateway (PGW) 236. Devices/networks of environment 200 may interconnect via wired connections, wireless connections, or a combination of wired and wireless connections.

As further shown in FIG. 2, eNB 222 may connect with MME 232 over a S1-MME interface, and may connect with SGW 234 over a S1-U interface. MME 232 may connect with SGW 234 over a S11 interface. SGW 234 may connect with PGW 236 over a S5 interface. Other connections not shown in FIG. 2 may also be utilized by devices of LTE network 220 and/or EPC network 230. For example, multiple MMEs 232 may connect with one another over S10 interfaces.

M2M device 210 may include a device that is capable of communicating over LTE network 220 and/or EPC network 230. In some implementations, M2M device 210 may include a sensor, a meter, machinery, a vending machine, a digital billboard, a telemetric device, an appliance, etc. In some implementations, other devices, such as a radiotelephone, a personal communications services (PCS) terminal, a smart phone, a laptop computer, a tablet computer, etc. may communicate over LTE network 220 and/or EPC network 230, instead of, or in addition to, M2M device 210.

LTE network 220 may include a communications network that connects subscribers (e.g., M2M device 210) to a service provider. In some implementations, LTE network 220 may include a wireless local area network (WLAN) or other access networks (e.g., an E-UTRAN or an eHRPD network). In some implementations, LTE network 220 may include a radio access network capable of providing a particular data rate, a particular latency, packet optimization, a particular capacity and coverage, etc.

eNB 222 may include one or more computation and communication devices, such as a base station, that receive traffic from MME 232 and/or SGW 234 and transmit that traffic to M2M device 210. eNB 222 may also include one or more devices that receive traffic from M2M device 210 and transmit that traffic to MME 232 and/or SGW 234 or to other M2M devices 210. eNB 222 may combine the functionalities of a base station and a radio network controller (RNC) in 2G or 3G radio access networks.

EPC network 230 may include a core network architecture of the 3GPP LTE wireless communication standard. In some implementations, EPC network 230 may include an IP packet-switched core network that supports high-speed wireless and wireline broadband access technologies. In some implementations, EPC network 230 may provide packet-switched voice services (e.g., which are traditionally circuit-switched) using an IP Multimedia Subsystem (IMS) network.

MME 232 may include one or more computation and communication devices that may be responsible for idle mode tracking and paging procedures (e.g., including retransmissions) for M2M device 210. MME 232 may be involved in a bearer activation/deactivation process (e.g., for M2M device 210) and may choose a SGW for M2M device 210 at an initial connect and at a time of intra-LTE handover. MME 232 may authenticate M2M device 210. Non-access stratum (NAS) signaling may terminate at MME 232 and MME 232 may generate and allocate temporary identities to M2M devices (e.g., M2M device 210). MME 232 may check authorization of M2M device 210 to utilize a service provider's PLMN and may enforce roaming restrictions for M2M device 210. MME 232 may be a termination point in EPC network 230 for ciphering/integrity protection for NAS signaling and may handle security key management. MME 232 may provide a control plane function for mobility between LTE and access networks with a S3 interface terminating at MME 232.

SGW 234 may route and forward user data packets, may act as a mobility anchor for a user plane during inter-eNB handovers, and may act as an anchor for mobility between LTE and other 3GPP technologies. For an idle state M2M device 210, SGW 234 may terminate a downlink data path and may trigger paging when downlink data arrives for M2M device 210. SGW 234 may manage and store contexts associated with M2M device 210 (e.g., parameters of an IP bearer service, network internal routing information, etc.). In some implementations, SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic.

PGW 236 may provide connectivity of M2M device 210 to external packet data networks by being a traffic exit/entry point for M2M device 210. M2M device 210 may simultaneously connect to more than one PGW for accessing multiple PDNs. PGW 236 may perform policy enforcement, packet filtering for each user, charging support, lawful intercept, and packet screening. PGW 236 may also act as an anchor for mobility between 3GPP and non-3GPP technologies. In some implementations, PGW 236 may include one or more traffic transfer devices (or network devices), such as a gateway, a router, a switch, a firewall, a NIC, a hub, a bridge, a proxy server, an OADM, or some other type of device that processes and/or transfers traffic.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for determining usage information for an access network based on signals generated by the access network. In some implementations, process 400 may be performed by M2M device 210. In some implementations, process 400 may be performed by another device or a group of devices separate from or including M2M device 210.

As shown in FIG. 4, process 400 may include monitoring signals from an access network at a particular time (block 410). For example, M2M device 210 may monitor radio frequency (RF) signals generated by LTE network 220 at a particular time and without connecting to LTE network 220. In some implementations, M2M device 210 may monitor RF signals generated by eNB 222 of LTE network 220 at the particular time. In some implementations, M2M device 210 may include a component (e.g., a sniffer, a software defined radio (SDR), etc.) that monitors the RF signals generated by LTE network 220 (e.g., generated by eNB 222) when M2M device 210 is physically located within a range of the RF signals of LTE network 220. In some implementations, M2M device 210 may store the RF signals in memory (e.g., memory 330, FIG. 3) associated with M2M device 210.

As further shown in FIG. 4, process 400 may include determining intensity patterns of the signals at different frequencies (block 420). For example, M2M device 210 may determine intensity patterns of the RF signals at different frequencies. In some implementations, the RF signals may be provided at different frequencies within a frequency range (e.g., between "600" and "650" megahertz (MHz), between "600" and "700" MHz, between "700" and "750" MHz, etc.), and the monitoring component of M2M device 210 may be tuned to the frequency range. In some implementations, an intensity pattern of a signal may include one or more amplitudes and/or phases of the RF signal at a particular frequency within the frequency range. The intensity patterns may include an array of values that represent the intensities of the amplitudes and/or the phases of the RF signals at the frequencies within the frequency range.

For example, assume that eNB 222 generates RF signals in a frequency range of "500" and "525" MHz. M2M device 210 may receive a first RF signal at "500" MHz and may determine a first amplitude and/or phase of the first RF signal; may receive a second RF signal at "501" MHz and may determine a second amplitude and/or phase of the second RF signal; may receive a third RF signal at "502" MHz and may determine a third amplitude and/or phase of the third RF signal; etc. In such an example, the first amplitude and/or phase may correspond to a first intensity pattern; the second amplitude and/or phase may correspond to a second intensity pattern; the third amplitude and/or phase may correspond to a third intensity pattern; etc.

In some implementations, the monitoring component of M2M device 210 may measure the intensities of the RF signals, and may perform a fast Fourier transform (FFT) on the measured intensities to generate the array of values that represent the intensities of the amplitudes and/or the phases of the RF signals.

As further shown in FIG. 4, process 400 may include connecting to the access network to determine an actual usage of the access network at the particular time (block 430). For example, M2M device 210 may connect to LTE network 220 in order to determine an actual usage or load of LTE network 220 at the particular time. In some implementations, M2M device 210 may connect to eNB 222 of LTE network 220 in order to determine an actual usage or load of eNB 222 at the particular time. In some implementations, the actual usage or load of LTE network 220 (e.g., eNB 222) may include information identifying an amount of bandwidth being utilized by LTE network 220 (e.g., 10%, 20%, 30%, etc. of the available bandwidth is being utilized); an amount of traffic being processed by LTE network 220; resource utilization by LTE network 220 (e.g., 10%, 20%, 30%, etc. of eNB 222 is being utilized); etc.

In some implementations, M2M device 210 may attempt to connect to LTE network 220 by providing a connect request to the LTE network 220 (e.g., to eNB 222). eNB 222 may permit M2M device 210 to connect to LTE network 220 based on the connect request. When M2M device 210 connects to LTE network 220 (e.g., to eNB 222), M2M device 210 may query eNB 222 for the actual usage of LTE network 220. eNB 222 may provide the actual usage of LTE network 220 to M2M device 210 based on the query. In some implementations, eNB 222 may automatically provide the actual usage of LTE network 220 to M2M device 210 without M2M device 210 providing a query.

As further shown in FIG. 4, process 400 may include correlating the intensity patterns and the actual usage to determine usage information for the access network (block 440). For example, M2M device 210 may correlate the intensity patterns of the RF signals at different frequencies with the actual usage of LTE network 220 in order to determine usage information for the access network at the particular time and at different frequencies. In some implementations, the usage information may include the intensities of the amplitudes and/or phases of the RF signals correlated with the actual usage of LTE network 220 at the particular time.

In some implementations, M2M device 210 may utilize a learning algorithm to correlate the intensity patterns of the RF signals with the actual usage of LTE network 220. In some implementations, the learning algorithm may include a learning vector quantization (LVQ) algorithm, a pattern recognition algorithm, a vector quantization (VQ) algorithm, etc. In some implementations, the learning algorithm may determine which of the intensity patterns of the RF signals correlate with a minimum usage of LTE network 220, a minimum to medium usage of LTE network 220, a medium usage of LTE network 220, a medium to maximum usage of LTE network 220, a maximum usage of LTE network 220, etc. In some implementations, the learning algorithm may assign a value to the usage associated with LTE network 220. For example, a usage of "0" may indicate the minimum usage of resources (e.g., by eNB 222) of LTE network 220; a usage of "3" may indicate the minimum to medium usage of the resources of LTE network 220; a usage of "5" may indicate the medium usage of the resources of LTE network 220; a usage of "7" may indicate the medium to maximum usage of the resources of LTE network 220; a usage of "10" may indicate the maximum usage of the resources of LTE network 220; etc. In some implementations, other designations may be utilized to indicate usage of the resources of LTE network 220.

As further shown in FIG. 4, process 400 may include determining whether a specified time period has expired (block 450). For example, M2M device 210 may periodically monitor the RF signals of LTE network 220 for a specified time period in order to correlate the intensity patterns of the RF signals with the actual usage of LTE network 220 and/or to update previously-determined correlations. In some implementations, M2M device 210 may continuously monitor the RF signals from LTE network 220, determine the intensity patterns of the RF signals, and correlate the intensity patterns with the actual usage of LTE network 220 until the specified time period has expired. In some implementations, M2M device 210 may set a counter value to zero when M2M device 210 begins monitoring the RF signals from LTE network 220, and may increment the counter value by the particular time every time M2M device 210 monitors the RF signals. M2M device 210 may determine whether the counter value is greater than or equal to the specified time period after M2M device 210 correlates the intensity patterns with the actual usage of LTE network 220. M2M device 210 may continue to increment the counter value until M2M device 210 determines that the counter value is greater than or equal to the specified time period.

As further shown in FIG. 4, if the specified time period has not expired (block 450-NO), process 400 may return to process block 410. For example, if M2M device 210 determines that the specified time period for monitoring the RF signals of LTE network 220 has not expired, M2M device 210 may continue to monitor the RF signals from LTE network 220, determine the intensity patterns of the RF signals, and correlate the intensity patterns with the actual usage of LTE network 220. In some implementations, M2M device 210 may determine that the specified time period has not expired when M2M device 210 determines that the counter value is less than the specified time period. If M2M device 210 determines that the counter value is less than the specified time period, M2M device 210 may increment the counter value by the particular time.

As further shown in FIG. 4, if the specified time period has expired (block 450-YES), process 400 may include storing the determined usage information for the access network (block 460). For example, if M2M device 210 determines that the specified time period for monitoring the RF signals of LTE network 220 has expired, M2M device 210 may store the determined usage information for LTE network 220 in memory associated with M2M device 210 (e.g., memory 330, FIG. 3). In some implementations, M2M device 210 may determine that the specified time period has expired when M2M device 210 determines that the counter value is greater than or equal to the specified time period.

In some implementations, M2M device 210 may store the usage information in a data structure (e.g., a table, a database, a list, etc.) provided in the memory of M2M device 210. For example, the data structure may include a table with a RF signal pattern field and a usage field. The RF signal pattern field may include information identifying the intensity patterns (e.g., amplitudes and/or phases) of the RF signals generated by LTE network 220. The usage field may include information identifying the actual usage of LTE network 220 that correlates with particular intensity patterns identified in the RF signal pattern field.

In some implementations, the usage information may be previously stored in M2M device 210, and M2M device 210 may perform process 400 to update and/or verify the usage information for a particular LTE network. In some implementations, usage information for a variety of access networks may be previously stored in M2M device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. In some implementations, process 400 may be performed by a device other than M2M device 210 and may generate the usage information for LTE network 220. In such implementations, the usage information for LTE network 220 may be provided to M2M device 210 and stored by M2M device 210 in memory.

Figure 5A:
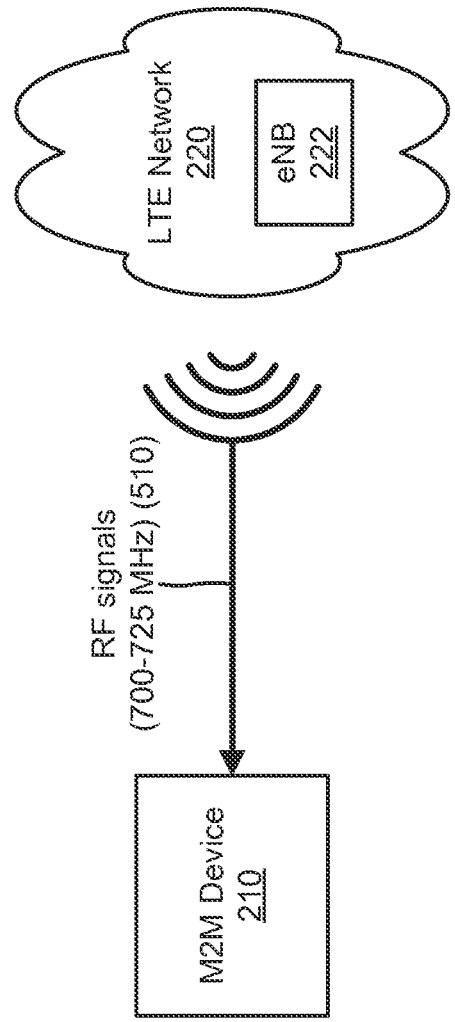

FIGS. 5A-5D are diagrams of an example 500 relating to example process 400 shown in FIG. 4. In example 500, assume that eNB 222 of LTE network 220 generates RF signals 510 in a frequency range of 700-725 MHz, as shown in FIG. 5A. At a particular time, M2M device 210 may monitor RF signals 510, at each frequency in the frequency range, with the monitoring component of M2M device 210. M2M device 210 may determine intensity patterns associated with RF signals 510 at each frequency in the frequency range.

For example, as shown in FIG. 5B, the frequency range of RF signals 510 may include multiple RF signal frequencies 520 (e.g., 700 MHz, 701 MHz, 702 MHz, . . . , 725 MHz). As further shown. RF signals 510 may generate multiple signal intensity patterns 530 at each RF signal frequency 520 of the frequency range. Each signal intensity pattern 530 may include one or more amplitudes and phases, as further shown in FIG. 5B. M2M device 210 may store signal intensity patterns 530 in a data structure provided in memory (e.g., memory 330, FIG. 3) of M2M device 210.

Figure 5C:
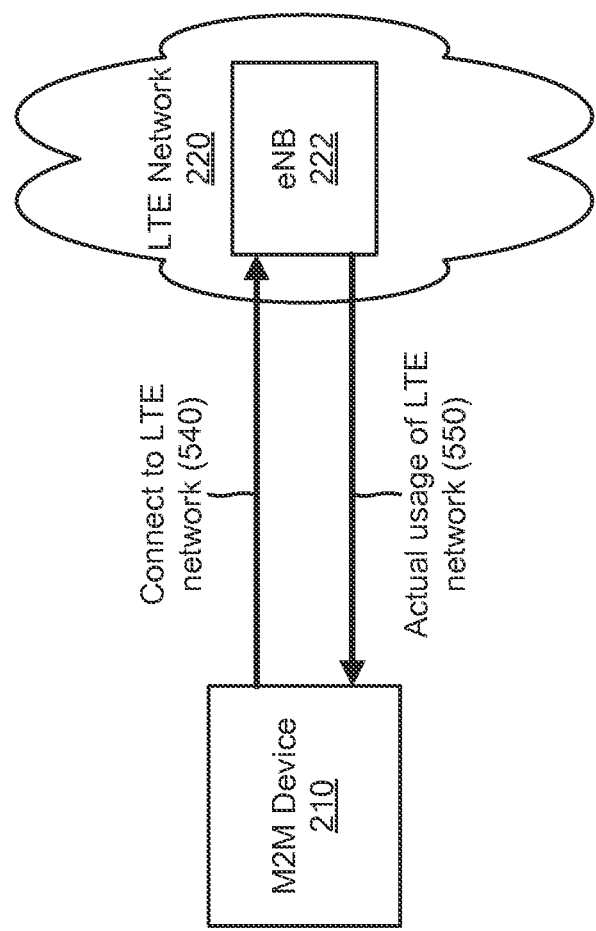

As shown in FIG. 5C, M2M device 210 may connect to LTE network 220 (e.g., to eNB 222), as indicated by reference number 540 in FIG. 5C. In some implementations, M2M device 210 may connect to LTE network 220 before receiving RF signals 510, while receiving RF signals 510, or after receiving RF signals 510 from LTE network 220. When M2M device 210 connects to eNB 222, M2M device 210 may query eNB 222 for an actual usage 550 of LTE network 220. eNB 222 may provide actual usage 550 of LTE network 220 to M2M device 210 based on the query. In some implementations, eNB 222 may automatically provide actual usage 550 of LTE network 220 to M2M device 210 without M2M device 210 providing a query.

M2M device 210 may correlate signal intensity patterns 530 with actual usage 550 of LTE network 220 to determine usage information for LTE network 220 at the particular time. M2M device 210 may continue to monitor RF signals 510, determine signal intensity patterns 530, and determine usage information for LTE network 220 at other times. For example, M2M device 210 may continue to determine usage information for LTE network 220 for a specified period of time (e.g., in minutes, hours, days, etc.) in order to identify when LTE network 220 is experiencing minimum usage of resources, maximum usage of resources, and/or usage of resources between the minimum usage and the maximum usage.

Figure 5D:
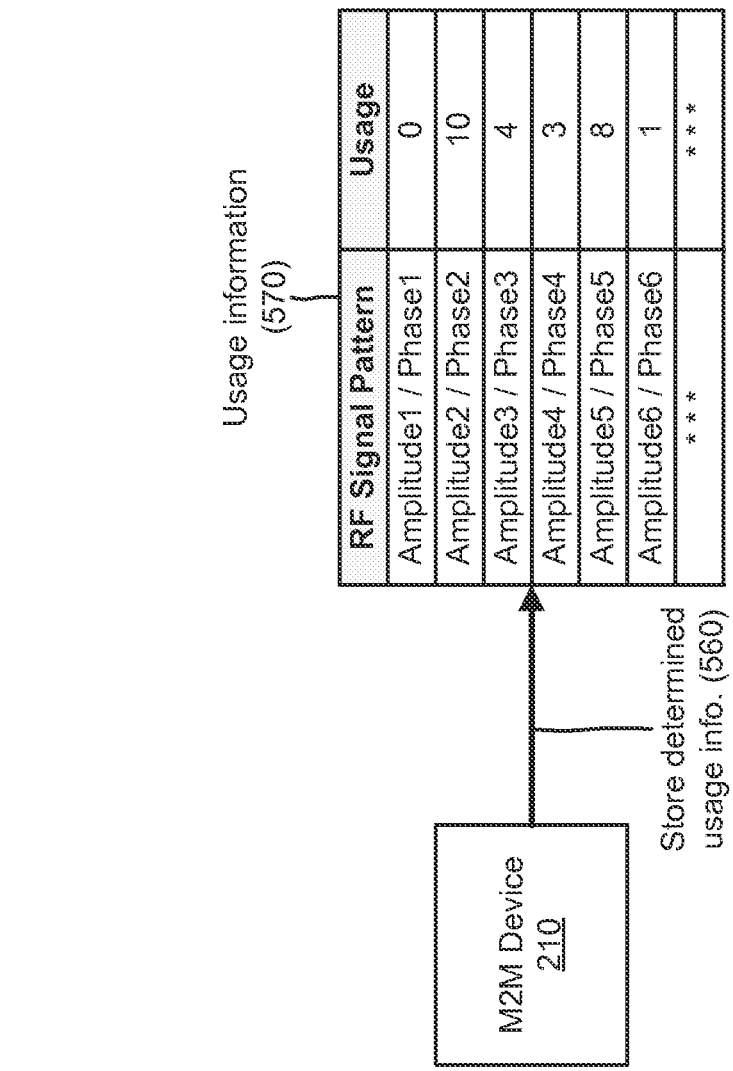

After determining the usage information for LTE network 220 for the specified period of time, M2M device 210 may store the determined usage information in a data structure provided in memory of M2M device 210, as indicated by reference number 560 in FIG. 5D. For example, the data structure may include a table of usage information 570 defined by a RF signal pattern field and a usage field. The RF signal pattern field may include information identifying signal intensity patterns 530 (e.g., the amplitudes and/or phases of signal intensity patterns 530) of RF signals 510 generated by LTE network 220. The usage field may include information identifying actual usage 550 of LTE network 220 that correlates with particular signal intensity patterns 530 identified in the RF signal pattern field. In some implementations, the usage field may include a value that indicates the usage associated with LTE network 220. For example, a usage of "0" may indicate the minimum usage of resources (e.g., by eNB 222) of LTE network 220, a usage of "10" may indicate the maximum usage of the resources of LTE network 220, and usage values in between "0" and "10" may indicate usage of the resources of LTE network 220 between the minimum usage and the maximum usage.

As indicated above, FIGS. 5A-5D are provided merely as an example. Other examples are possible and may differ from what was described with regard to FIGS. 5A-5D. In some implementations, the various operations described in connection with FIGS. 5A-5D may be performed automatically or at the request of a user of M2M device 210.

FIG. 6 is a flow chart of an example process 600 for determining when a M2M device can connect to an access network based on usage of the access network. In some implementations, process 600 may be performed by M2M device 210. In some implementations, process 600 may be performed by another device or a group of devices separate from or including M2M device 210.

As shown in FIG. 6, process 600 may include monitoring a signal from an access network (block 610). For example, M2M device 210 may monitor a radio frequency (RF) signal generated by LTE network 220 (e.g., by eNB 222), without connecting to LTE network 220. In some implementations, M2M device 210 may utilize the monitoring component (e.g., the sniffer, the software defined radio (SDR), etc.) to monitor the RF signal generated by LTE network 220 when M2M device 210 is physically located within a range of the RF signal of LTE network 220. In some implementations, M2M device 210 may monitor the RF signal of LTE network 220 when M2M device 210 needs to upload data to EPC network 230, via LTE network 220. In some implementations, M2M device 210 may continuously monitor RF signals of LTE network 220 to determine whether the usage associated with LTE network 220 is conducive for uploading the data to EPC network 230.

As further shown in FIG. 6, process 600 may include comparing the signal to usage information to determine a usage of the access network (block 620). For example, M2M device 210 may compare the RF signal to usage information associated with LTE network 220 in order to determine a usage of LTE network 220. In some implementations, M2M device 210 may store the usage information of LTE network 220 in a data structure provided in memory (e.g., memory 330, FIG. 3) of M2M device 210, as described above in connection with FIGS. 4-5D. In some implementations, the monitoring component of M2M device 210 may measure an intensity of the RF signal, and may perform a fast Fourier transform on the measured intensity to generate values that represent an intensity of an amplitude and/or a phase of the RF signal.

In some implementations, M2M device 210 may compare the intensity (e.g., the amplitude and/or phase) of the RF signal to information identifying the intensity patterns of the RF signals generated by LTE network 220 (e.g., provided in the RF signal pattern field of the data structure storing the usage information). If M2M device 210 finds a matching intensity pattern entry in the RF signal pattern field, M2M device 210 may determine the usage of LTE network 220 based on an entry, provided in the usage field of the data structure, that corresponds to the matching intensity pattern entry. For example, assume that the RF signal pattern field of the data structure includes entries for amplitudes of "1," "2," "3," and "4," and that the usage field includes corresponding entries of high, medium, low, and medium. If the intensity of the RF signal is "3," M2M device 210 may determine that the usage of LTE network 220 is low. In some implementations, the usage field may include values assigned to the usage associated with LTE network 220 (e.g., "0" may indicate minimum usage, "10" may indicate maximum usage, and values between "0" and "10" may indicate usage between the minimum usage and the maximum usage).

In some implementations, M2M device 210 may utilize a learning algorithm (e.g., a LVQ algorithm, a pattern recognition algorithm, a VQ algorithm, etc.) to compare the intensity of the RF signal with the usage information associated with LTE network 220. In such implementations, the learning algorithm may determine the usage of LTE network 220 based on the comparison of the intensity of the RF signal with the usage information.

As further shown in FIG. 6, process 600 may include determining whether the usage of the access network is greater than a threshold (block 630). For example, M2M device 210 may determine whether the usage of LTE network 220 is greater than a particular threshold. In some implementations, the particular threshold may be set for M2M device 210 by a user of M2M device 210. For example, if M2M device 210 is a vending machine, an owner or an operator of the vending machine may set the particular threshold. In some implementations, the particular threshold may be set for M2M device 210 by LTE network 220 (e.g., by eNB 222) or by an administrator associated with LTE network 220 (e.g., a telecommunications provider). In some implementations, M2M device 210 may automatically set, or be pre-programmed with, the particular threshold.

In some implementations, the particular threshold may include a value associated with the usage of LTE network 220. For example, assume that the usage information includes a value of "0" to indicate a minimum usage of resources (e.g., by eNB 222) of LTE network 220; a value of "10" to indicate a maximum usage of the resources of LTE network 220; and values in between "0" and "10" to indicate usage between the minimum usage and the maximum usage. In such an example, the particular threshold may include a value between "0" and "10." In some implementations, other designations may be utilized for the particular threshold.

In some implementations, the particular threshold may change based on conditions associated with M2M device 210. For example, if M2M device 210 is attempting to connect to LTE network 220 (e.g., to upload data to EPC network 230) for a first time, the particular threshold may be set to a lower value (e.g., to make connection more difficult) since uploading the data may not be urgent for M2M device 210 at this time. However, if M2M device 210 is attempting to connect to LTE network 220 an X (X>1, where X may be a configurable threshold) number of times, or if M2M device 210 needs to upload urgent data, the particular threshold may be changed to a higher value so that M2M device 210 may connect to LTE network 220 (e.g., even if LTE network 220 is congested and to make connection less difficult).

As further shown in FIG. 6, if the usage of the access network is greater than the threshold (block 630-YES), process 600 may include not connecting to the access network (block 640) and returning to process block 610. For example, if M2M device 210 determines that the usage of LTE network 220 is greater than the particular threshold, M2M device 210 may not connect to LTE network 220 and may continue to monitor RF signals from LTE network 220. In some implementations, M2M device 210 may determine that the usage of LTE network 220 is greater than the particular threshold when the value associated with the usage of LTE network 220 (e.g., as provided in the usage field of the data structure) is greater than the value for the particular threshold. For example, if the particular threshold is "4" and the usage of LTE network is greater than "4," M2M device 210 may determine that the usage of LTE network 220 is greater than the particular threshold.

As further shown in FIG. 6, if the usage of the access network is not greater than the threshold (block 630-NO), process 600 may include connecting to the access network (block 650). For example, if M2M device 210 determines that the usage of LTE network 220 is not greater than the particular threshold, M2M device 210 may connect to LTE network 220. In some implementations, M2M device 210 may determine that the usage of LTE network 220 is not greater than the particular threshold when the value associated with the usage of LTE network 220 (e.g., as provided in the usage field of the data structure) is not greater than the value for the particular threshold. For example, if the particular threshold is "4" and the usage of LTE network is less than "4," M2M device 210 may determine that the usage of LTE network 220 is not greater than the particular threshold.

In some implementations, M2M device 210 may attempt to connect to LTE network 220 by providing a connect request to the LTE network 220 (e.g., to eNB 222). eNB 222 may permit M2M device 210 to connect to LTE network 220 based on the connect request. In some implementations, eNB 222 may automatically permit M2M device 210 to connect to LTE network 220 when the usage of LTE network 220 is not greater than the particular threshold or a threshold determined by eNB 222 (which may be the same as or different than the particular threshold), and without receiving a connect request.

As further shown in FIG. 6, process 600 may include providing data to a core network via the connection to the access network (block 660). For example, M2M device 210 may provide data to EPC network 230 via the connection to LTE network 220 (e.g., to eNB 222). In some implementations, M2M device 210 may provide data associated with M2M device 210 to a server device (e.g., provided in or connected to EPC network 230) associated with an entity that owns or operates M2M device 210. For example, if M2M device 210 is a vending machine, the vending machine may provide, to the server device, information associated with an amount of money that has been received by the vending machine, an amount of product remaining in the vending machine, whether the vending machine is operating correctly, etc. In some implementations, M2M device 210 may receive data from the server device via LTE network 220 and EPC network 230. For example, M2M device 210 may receive instructions for when to upload data in the future, a value for the particular threshold, etc. from the server device.

As further shown in FIG. 6, process 600 may include determining an actual usage of the access network (block 670). For example, M2M device 210 may determine an actual usage or load of LTE network 220 (e.g., eNB 222) via the connection to LTE network 220. In some implementations, the actual usage or load of LTE network 220 (e.g., eNB 222) may include information identifying an amount of bandwidth being utilized by LTE network 220 (e.g., 10%, 20%, 30%, etc. of the available bandwidth is being utilized); an amount of traffic being processed by LTE network 220; resource utilization by LTE network 220 (e.g., 10%, 20%, 30%, etc. of eNB 222 is being utilized); etc.

In some implementations, M2M device 210 may query eNB 222 for the actual usage of LTE network 220. eNB 222 may provide the actual usage of LTE network 220 to M2M device 210 based on the query. In some implementations, eNB 222 may automatically provide the actual usage of LTE network 220 to M2M device 210 without M2M device 210 providing a query. In some implementations, M2M device 210 may disconnect from LTE network 220 (e.g., eNB 222) after determining the actual usage of LTE network 220.

As further shown in FIG. 6, process 600 may include updating the usage information based on the actual usage (block 680). For example, M2M device 210 may update the usage information associated with LTE network 220 when the usage of LTE network 220, determined from the usage information, is different than the actual usage of LTE network 220. In some implementations, if that actual usage of LTE network 220 is the same or similar to the usage of LTE network 220 determined from the usage information (e.g., within a particular standard deviation), M2M device 210 may determine that the usage information is correct and may not update the usage information. In some implementations, M2M device 210 may update the learning algorithm (e.g., a LVQ algorithm, a pattern recognition algorithm, a VQ algorithm, etc.) based on the actual usage of LTE network 220.

In some implementations, M2M device 210 may update an entry in the usage field of the data structure storing the usage information based on the actual usage of LTE network 220. For example, if the entry in the usage field includes a value of "4" and the actual usage of LTE network 220 is determined to be a value of "3," M2M device 210 may update the entry to include a value of "3."

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
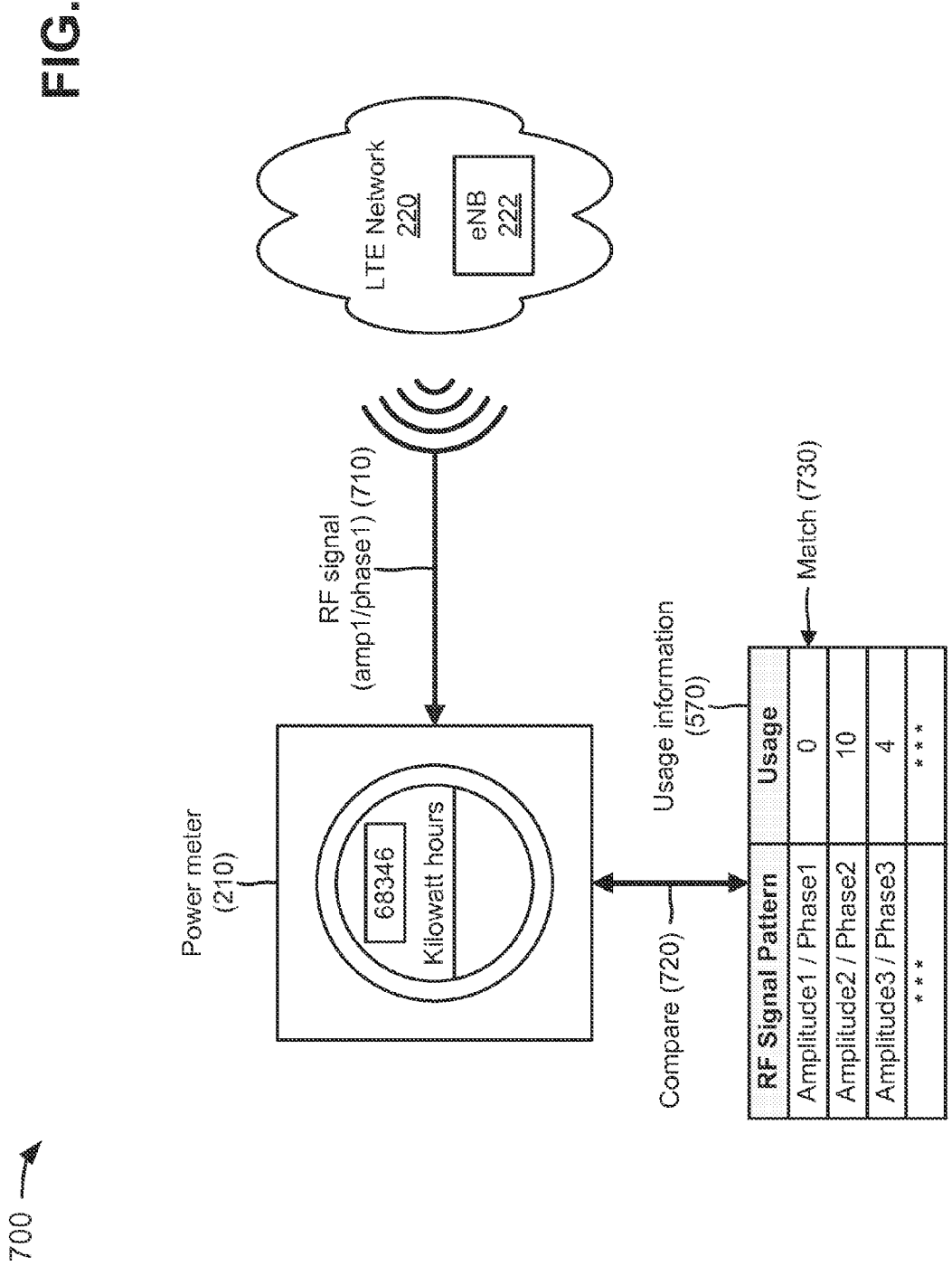
FIGS. 7A-7C are diagrams of an example relating to the example process shown in FIG. 6.
Figure 7B:
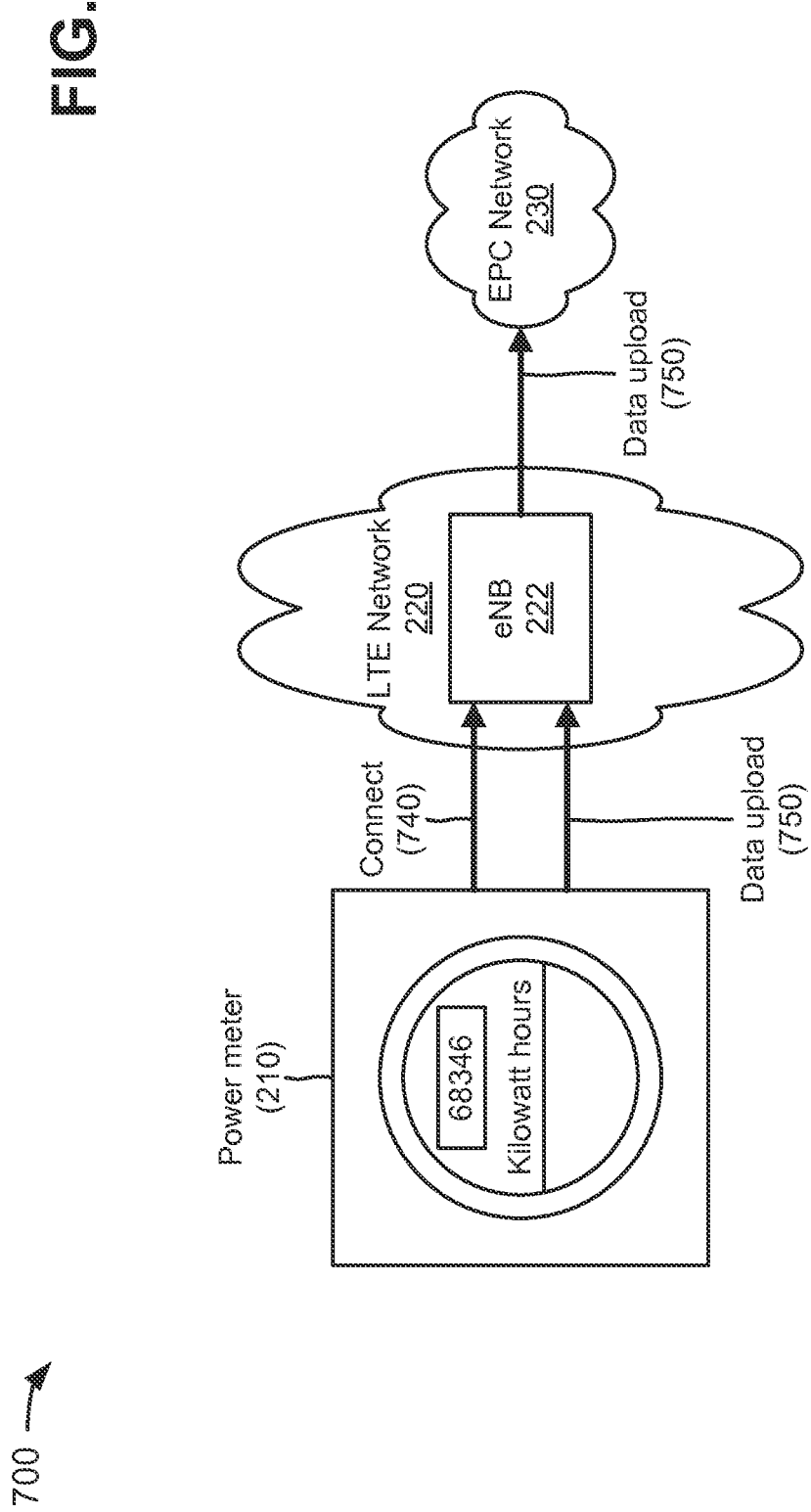
Figure 7C:
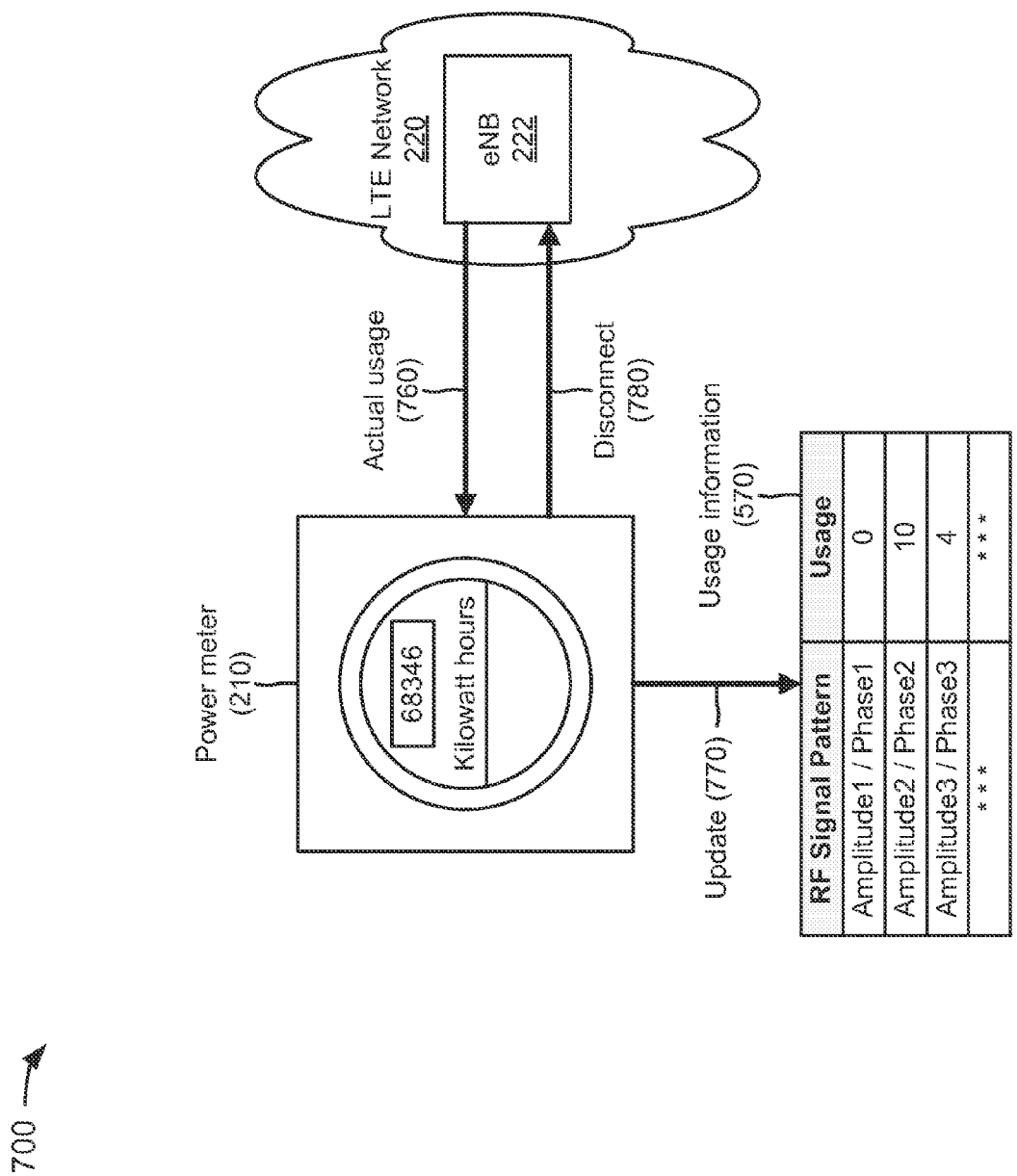

FIGS. 7A-7C are diagrams of an example 700 relating to example process 600 shown in FIG. 6. In example 700, assume that eNB 222 of LTE network 220 generates a RF signal 710 that includes a first amplitude (amp1) and a first phase (phase1), as shown in FIG. 7A. Further, assume that M2M device 210 is a power meter 210 that needs to upload data (e.g., power readings) to a server device associated with power meter 210 (e.g., a server device of a utility company). Assume that power meter 210 monitors RF signal 710 generated by eNB 222 in order to determine whether power meter 210 can connect to LTE network 220 and upload the data. Power meter 210 may compare RF signal 710 to usage information 570 (FIG. 5D) in order to determine a usage associated with LTE network 220, as indicated by reference number 720 in FIG. 7A. For example, power meter 210 may identify an entry 730 in the RF signal pattern field of usage information 570 that matches the first amplitude and/or the first phase of RF signal 710, and may determine the usage of LTE network 220 based on a corresponding entry in the usage field of usage information 570. As shown in FIG. 7A, power meter 210 may determine that the usage of LTE network 220 is associated with a value of "0," which may indicate a minimum usage of LTE network 220.

Power meter 210 may determine whether the usage of LTE network 220 (e.g., "0") is greater than a particular threshold associated with connecting to LTE network 220. If the usage of LTE network 220 (e.g., "0") is greater than the particular threshold, power meter 210 may not connect to LTE network 220. In example 700, assume that power meter 210 determines that the usage of LTE network 220 (e.g., "0") is not greater than the particular threshold. Based on this determination, power meter 210 may determine that power meter 210 may connect to LTE network 220, and may connect to eNB 222, as indicated by reference number 740 in FIG. 7B. As further shown in FIG. 7B, power meter 210 may upload data 750 to EPC network 230 via eNB 222. EPC network 230 may provide data 750 to the server device associated with the utility company.

As shown in FIG. 7C, power meter 210 may receive an actual usage 760 of LTE network 220 (e.g., eNB 222) from eNB 222. Power meter 210 may compare actual usage 760 to the usage of LTE network 220 (e.g., "0") that power meter 210 determined from usage information 570. If actual usage 760 is different than the usage determined from usage information 570. power meter 210 may update usage information 570 based on actual usage 760, as indicated by reference number 770 in FIG. 7C. For example, if actual usage 760 is associated with a value of "1," power meter 210 may replace the first entry (e.g., "0") in the usage field of usage information 570 with the value of "1." As further shown in FIG. 7C, power meter 210 may disconnect from LTE network 220 (e.g., eNB 222), as indicated by reference number 780, after receiving actual usage 760 from eNB 222.

As indicated above, FIGS. 7A-7C are provided merely as an example. Other examples are possible and may differ from what was described with regard to FIGS. 7A-7C. In some implementations, the various operations described in connection with FIGS. 7A-7C may be performed automatically or at the request of a user of M2M device 210.

FIG. 8 is a flow chart of another example process 800 for determining when a M2M device can connect to an access network based on usage of the access network. In some implementations, process 800 may be performed by M2M device 210. In some implementations, process 800 may be performed by another device or a group of devices separate from or including M2M device 210.

As shown in FIG. 8, process 800 may include receiving a pilot channel, with a usage of an access network, without connecting to the access network (block 810). For example, M2M device 210 may receive a pilot channel generated by LTE network 220 (e.g., by eNB 222), without connecting to LTE network 220. In some implementations, the pilot channel may include information identifying a usage associated with LTE network 220 (e.g., eNB 222), and M2M device 210 may determine the usage of LTE network 220 based on the information in the pilot channel. In some implementations, the pilot channel may be continuously transmitted by eNB 222, and may include a resource block. In some implementations, eNB 222 may encode bits, indicating the usage of LTE network 220, into the resource block of the pilot channel. In some implementations, eNB 222 may assign a value to the usage associated with LTE network 220. For example, a value of "0" may indicate a minimum usage of resources (e.g., eNB 222) of LTE network 220; a value of "10" may indicate a maximum usage of the resources of LTE network 220; and a value between "0" and "10" may indicate a usage of resources of LTE network 220 between the minimum usage and the maximum usage. In some implementations, other designations may be utilized to indicate usage of the resources of LTE network 220.

As further shown in FIG. 8, process 800 may include determining whether the usage of the access network is greater than a threshold (block 820). For example, M2M device 210 may determine whether the usage of LTE network 220 is greater than a particular threshold. In some implementations, the particular threshold may be set for M2M device 210 by a user of M2M device 210. For example, if M2M device 210 is a utility meter, an owner or an operator of the utility meter may set the particular threshold. In some implementations, the particular threshold may be set for M2M device 210 by LTE network 220 (e.g., eNB 222) or by an administrator associated with LTE network 220 (e.g., a telecommunications provider). In some implementations, M2M device 210 may set or may be pre-programmed with the particular threshold.

In some implementations, the particular threshold may include a value associated with the usage of LTE network 220. For example, assume that the usage of LTE network 220 includes a value of "0" to indicate a minimum usage of resources (e.g., eNB 222) of LTE network 220; a value of "10" to indicate a maximum usage of the resources of LTE network 220; and values in between "0" and "10" to indicate usage between the minimum usage and the maximum usage. In such an example, the particular threshold may include a value between "0" and "10." In some implementations, other designations may be utilized for the particular threshold.

In some implementations, the particular threshold may change based on conditions associated with M2M device 210. For example, if M2M device 210 is attempting to connect to LTE network 220 (e.g., to upload data to EPC network 230)

for a first time, the particular threshold may be set to a lower usage value (e.g., to make connection more difficult) since uploading the data may not be urgent for M2M device 210 at this time. However, if M2M device 210 is attempting to connect to LTE network 220 an X (X>1, where X may be a configurable threshold) number of times, or if M2M device 210 needs to upload urgent data, the particular threshold may be changed to a higher usage value so that M2M device 210 may connect to LTE network 220 (e.g., even if LTE network 220 is congested and to make connection less difficult).

As further shown in FIG. 8, if the usage of the access network is greater than the threshold (block 820-YES), process 800 may include not connecting to the access network (block 830) and returning to process block 810. For example, if M2M device 210 determines that the usage of LTE network 220 is greater than the particular threshold, M2M device 210 may not connect to LTE network 220 and may continue to receive the pilot channel from LTE network 220. In some implementations, M2M device 210 may determine that the usage of LTE network 220 is greater than the particular threshold when the value associated with the usage of LTE network 220 (e.g., as provided in the pilot channel) is greater than the value for the particular threshold. For example, if the particular threshold is "2" and the usage of LTE network is greater than "2," M2M device 210 may determine that the usage of LTE network 220 is greater than the particular threshold.

As further shown in FIG. 8, if the usage of the access network is not greater than the threshold (block 820-NO), process 800 may include connecting to the access network (block 840). For example, if M2M device 210 determines that the usage of LTE network 220 is not greater than the particular threshold, M2M device 210 may connect to LTE network 220. In some implementations, M2M device 210 may determine that the usage of LTE network 220 is not greater than the particular threshold when the value associated with the usage of LTE network 220 (e.g., as provided in the pilot channel) is not greater than the value for the particular threshold. For example, if the particular threshold is "5" and the usage of LTE network is less than "5," M2M device 210 may determine that the usage of LTE network 220 is not greater than the particular threshold.

In some implementations, M2M device 210 may attempt to connect to LTE network 220 by providing a connect request to the LTE network 220 (e.g., to eNB 222). eNB 222 may permit M2M device 210 to connect to LTE network 220 based on the connect request. In some implementations, eNB 222 may automatically permit M2M device 210 to connect to LTE network 220 when the usage of LTE network 220 is not greater than the particular threshold or a threshold determined by eNB 222 (which may be the same as or different than the particular threshold), and without receiving a connect request.

As further shown in FIG. 8, process 800 may include providing data to a core network via the connection to the access network (block 850). For example, M2M device 210 may provide data to EPC network 230 via the connection to LTE network 220 (e.g., to eNB 222). In some implementations, M2M device 210 may provide data associated with M2M device 210 to a server device (e.g., provided in or connected to EPC network 230) associated with an entity that owns or operates M2M device 210. For example, if M2M device 210 is a utility meter, the utility meter may provide, to the server device, information associated with an amount of a utility (e.g., electricity) utilized by a household, a building, etc. In some implementations, M2M device 210 may receive data from the server device via LTE network 220 and EPC network 230. For example, M2M device 210 may receive instructions for when to upload data in the future, a value for the particular threshold, etc. from the server device. In some implementations, M2M device 210 may disconnect from LTE network 220 (e.g., eNB 222) after providing the data to the server device.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
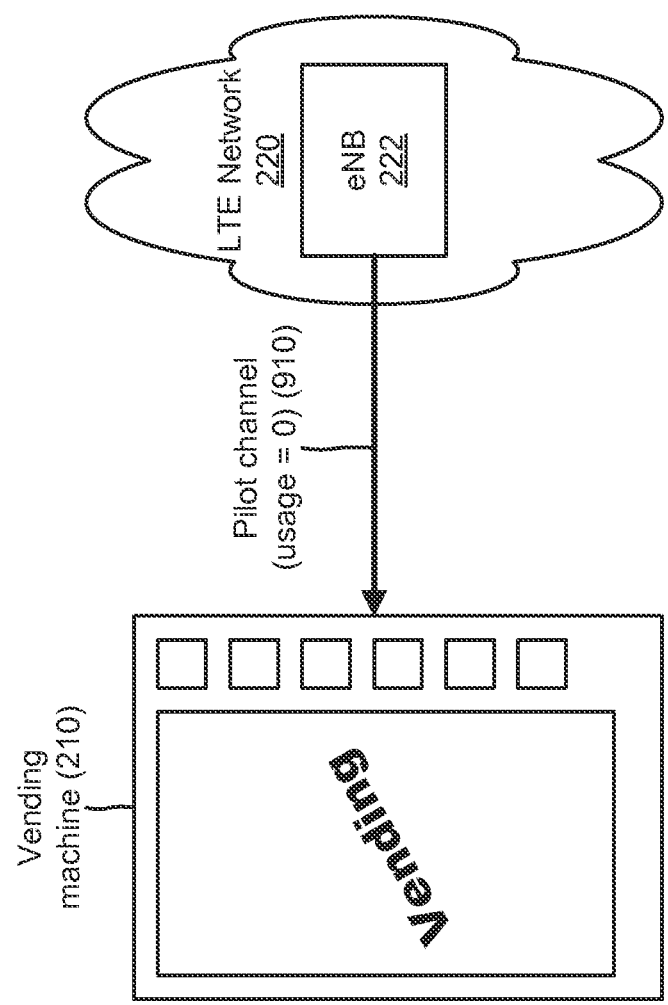
FIGS. 9A and 9B are diagrams of an example relating to the example process shown in FIG. 8.
Figure 9B:
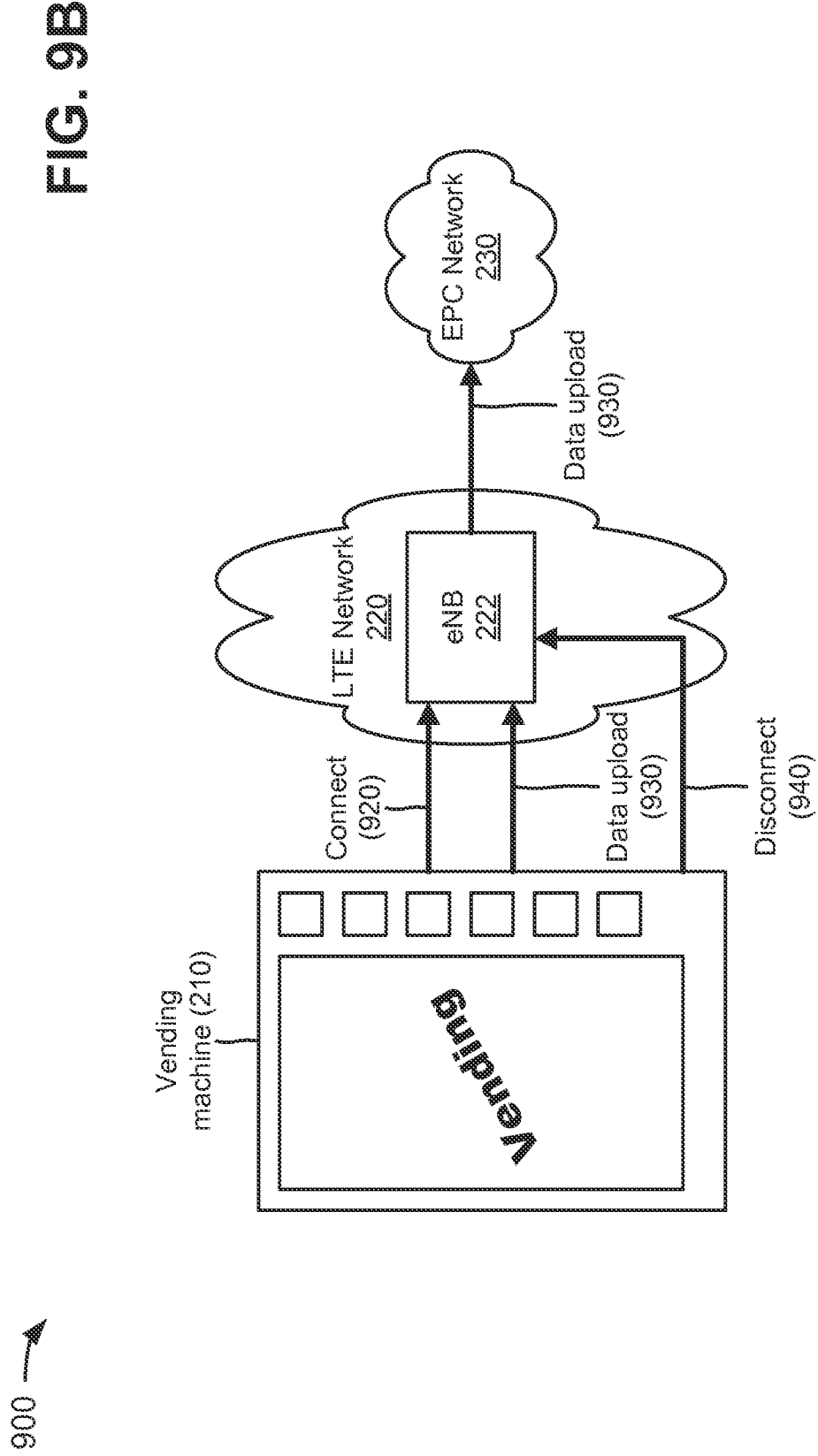

FIGS. 9A and 9B are diagrams of an example 900 relating to example process 800 shown in FIG. 8. In example 900, assume that eNB 222 of LTE network 220 generates a pilot channel 910 that includes information identifying a usage of LTE network 220 (e.g., a value of "0"), as shown in FIG. 9A. Further, assume that M2M device 210 is a vending machine 210 that needs to upload data (e.g., information about money received, items remaining, etc.) to a server device associated with vending machine 210 (e.g., a server device of a vending machine company). Assume that vending machine 210 receives pilot channel 910 generated by eNB 222 in order to determine whether vending machine 210 can connect to LTE network 220 and upload the data. Vending machine 210 may determine the usage of LTE network 220 based on the usage provided in pilot channel 910. For example, vending machine 210 may determine that the usage of LTE network 220 is associated with a value of "0," which may indicate a minimum usage of LTE network 220.

Vending machine 210 may determine whether the usage of LTE network 220 (e.g., "0") is greater than a particular threshold associated with connecting to LTE network 220. If the usage of LTE network 220 (e.g., "0") is greater than the particular threshold, vending machine 210 may not connect to LTE network 220. Assume that vending machine 210 determines that the usage of LTE network 220 (e.g., "0") is not greater than the particular threshold. Based on this determination, vending machine 210 may determine that vending machine 210 may connect to LTE network 220. Vending machine 210 may connect to eNB 222, as indicated by reference number 920 in FIG. 9B. As further shown in FIG. 9B, vending machine 210 may upload data 930 to EPC network 230 via eNB 222. EPC network 230 may provide data 930 to the server device associated with the vending machine company. Vending machine 210 may disconnect from LTE network 220 (e.g., eNB 222), as indicated by reference number 940, after providing data 930 to EPC network 230.

As indicated above, FIGS. 9A and 9B are provided merely as an example. Other examples are possible and may differ from what was described with regard to FIGS. 9A and 9B. In some implementations, the various operations described in connection with FIGS. 9A and 9B may be performed automatically or at the request of a user of M2M device 210.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a plurality of signals from an access network at a particular time within a time period;
   determining, by the device, signal patterns of the plurality of signals at different frequencies;
   connecting, by the device, to the access network to determine an actual usage of the access network at the particular time;
   correlating, by the device, the signal patterns of the plurality of signals and the actual usage to determine usage information for the access network at the particular time, the usage information including:
      information associated with the signal patterns generated by the access network over the time period, and
      information associated with usage of the access network over the time period;
   receiving, by the device and after receiving the plurality of signals, a signal from an access network without connecting to the access network;
   comparing, by the device, the signal to the usage information to determine a usage of the access network;
   determining, by the device, whether the determined usage of the access network is greater than a particular usage associated with the access network; and
   selectively connecting, by the device, to the access network based on whether the determined usage of the access network is greater than the particular usage,
      the device connecting to the access network when the determined usage of the access network is not greater than the particular usage, and
      the device not connecting to the access network when the determined usage of the access network is greater than the particular usage.

2. The method of claim 1, further comprising:
   determining an updated actual usage of the access network after selectively connecting to the access network; and
   updating the usage information, based on the actual usage, when the updated actual usage is different than the determined usage of the access network.

3. The method of claim 2, further comprising:
   disconnecting from the access network after determining the updated actual usage of the access network.

4. The method of claim 1, further comprising:
   determining that the time period has not expired;
   determining other usage information for the access network at other particular times within the time period;
   storing the other usage information for the access network at the other particular times,
      the usage information for the access network at the particular time and the other usage information for the access network, at the other particular times, corresponding to the usage information for the access network; and
   disconnecting from the access network.

5. The method of claim 1, where the device includes a machine-to-machine (M2M) device.

6. The method of claim 1, further comprising:
   disconnecting from the access network after connecting to the access network to determine the actual usage of the access network at the particular time and before receiving the signal.

7. A device, comprising:
   one or more processors to:
      receive a plurality of signals from an access network at a particular time within a time period;
      determine signal patterns of the plurality of signals at different frequencies;
      connect to the access network to determine an actual usage of the access network at the particular time
      correlate the signal patterns of the plurality of signals and the actual usage to determine usage information for the access network at the particular time,
         the usage information including:
            information associated with the signal patterns generated by the access network over the time period, and
            information associated with usage of the access network over the time period;

receive a signal from the access network, without connecting to the access network, after receiving the plurality of signals;
compare the signal to the usage information to determine a usage of the access network;
determine whether the determined usage of the access network is greater than a particular usage associated with the access network; and
selectively connect to the access network based on whether the determined usage of the access network is greater than the particular usage,
the device connecting to the access network when the determined usage of the access network is not greater than the particular usage, and
the device not connecting to the access network when the determined usage of the access network is greater than the particular usage.

8. The device of claim 7, where the one or more processors are further to:
determine an updated actual usage of the access network after connecting to the access network; and
update the usage information, based on the updated actual usage, when the updated actual usage is different than the determined usage of the access network.

9. The device of claim 8, where the one or more processors are further to:
disconnect from the access network after determining the updated actual usage of the access network.

10. The device of claim 7, where, prior to receiving the signal from the access network, the one or more processors are further to:
receive other usage information; and
store other usage information in a memory.

11. The device of claim 7, where the one or more processors are further to:
determine that the time period has not expired;
determine other usage information for the access network at other particular times within the time period;
store the other usage information for the access network at the other particular times,
the usage information for the access network at the particular time and the other usage information for the access network, at the other particular times, corresponding to the usage information associated with the access network; and
disconnect from the access network.

12. The device of claim 7, where, when correlating the signal patterns of the plurality of signals and the actual usage, the one or more processors are to:
utilize a learning algorithm to correlate the signal patterns of the plurality of signals and the actual usage; and
determine the usage information for the access network at the particular time based on the correlation by the learning algorithm.

13. The device of claim 7, where the device includes a machine-to-machine (M2M) device.

14. A non-transitory computer-readable medium storing instructions, the instructions comprising:
one or more instructions that, when executed by a processor of a device, cause the processor to:
receive a plurality of signals from an access network at a particular time within a time period;
determine signal patterns of the plurality of signals at different frequencies;
connect to the access network to determine an actual usage of the access network at the particular time;
correlate the signal patterns of the plurality of signals and the actual usage to determine usage information for the access network at the particular time,
the usage information including:
information associated with the signal patterns generated by the access network over the time period, and
information associated with usage of the access network over the time period;
receive a signal from the access network, without connecting to the access network, after receiving the plurality of signals;
compare the signal to the usage information to determine a usage of the access network;
determine whether the determined usage of the access network is greater than a particular usage associated with the access network; and
selectively connect to the access network based on whether the determined usage of the access network is greater than the particular usage,
the device connecting to the access network when the determined usage of the access network is not greater than the particular usage, and
the device not connecting to the access network when the determined usage of the access network is greater than the particular usage.

15. The non-transitory computer-readable medium of claim 14, where the one or more instructions, when executed by the processor of the device, cause the processor to:
determine an updated actual usage of the access network after connecting to the access network; and
update the usage information, based on the updated actual usage, when the updated actual usage is different than the determined usage of the access network.

16. The non-transitory computer-readable medium of claim 15, where the one or more instructions, when executed by the processor of the device, cause the processor to:
disconnect from the access network after determining the updated actual usage of the access network.

17. The non-transitory computer-readable medium of claim 14, where the one or more instructions, when executed by the processor of the device, cause the processor to:
receive other usage information; and
store the other usage information.

18. The non-transitory computer-readable medium of claim 14, where the one or more instructions, when executed by the processor of the device, cause the processor to:
determine that the time period has not expired;
determine other usage information for the access network at other particular times within the time period;
store the other usage information for the access network at the other particular times,
the usage information for the access network at the particular time and the other usage information for the access network, at the other particular times, corresponding to the usage information associated with the access network; and
disconnect from the access network.

19. The non-transitory computer-readable medium of claim 14, where the one or more instructions, when correlating the signal patterns of the plurality of signals and the actual usage, cause the processor to:
utilize a learning algorithm to correlate the signal patterns of the plurality of signals and the actual usage; and
determine the usage information for the access network at the particular time based on the correlation by the learning algorithm.

20. The non-transitory computer-readable medium of claim 14, where the device includes a machine-to-machine (M2M) device.

* * * * *